US007597165B2

(12) United States Patent
Kaneko et al.

(10) Patent No.: US 7,597,165 B2
(45) Date of Patent: Oct. 6, 2009

(54) HYBRID VEHICLE AND CONTROL METHOD OF THE SAME

(75) Inventors: Jiro Kaneko, Toyota (JP); Masatoshi Adachi, Aichi-ken (JP)

(73) Assignee: Toyota Jidosha Kabuhsiki Kaisha, Toyota-shi (JP)

( * ) Notice: Subject to any disclaimer, the term of this patent is extended or adjusted under 35 U.S.C. 154(b) by 443 days.

(21) Appl. No.: 11/661,986

(22) PCT Filed: Sep. 26, 2005

(86) PCT No.: PCT/JP2005/018214

§ 371 (c)(1),
(2), (4) Date: Mar. 6, 2007

(87) PCT Pub. No.: WO2006/038572

PCT Pub. Date: Apr. 13, 2006

(65) Prior Publication Data

US 2007/0256871 A1  Nov. 8, 2007

(30) Foreign Application Priority Data

Oct. 6, 2004 (JP) .............................. 2004-293651

(51) Int. Cl.
*B60K 1/00* (2006.01)
(52) U.S. Cl. .................... 180/65.6; 180/65.285; 701/22; 903/915; 903/945; 475/5
(58) Field of Classification Search ................ 180/65.1, 180/65.21, 65.275, 65.285, 65.6, 65.7; 475/3, 475/4, 5; 701/22; 903/904, 909, 910, 911, 903/912, 913, 914, 915, 916, 917, 918, 919, 903/945
See application file for complete search history.

(56) References Cited

U.S. PATENT DOCUMENTS

| 5,513,719 | A  |   | 5/1996 | Moroto et al. |       |
|-----------|----|---|--------|---------------|-------|
| 6,358,173 | B1 | * | 3/2002 | Klemen et al. | 475/5 |
| 6,554,736 | B2 | * | 4/2003 | Takano et al. | 477/5 |
| 6,579,201 | B2 | * | 6/2003 | Bowen         | 475/5 |
| 7,059,986 | B2 | * | 6/2006 | Schmidt       | 475/5 |
| 7,081,060 | B2 | * | 7/2006 | Hata et al.   | 475/5 |
| 7,220,199 | B2 | * | 5/2007 | Anthoine et al.| 475/5 |
| 2001/0010027 | A1 |  | 7/2001 | Takano et al. |       |

FOREIGN PATENT DOCUMENTS

| JP | 2004-066898 | 3/2004 |
|----|-------------|--------|
| JP | 2004-353782 | 12/2004|

* cited by examiner

*Primary Examiner*—S. Joseph Morano
*Assistant Examiner*—John D. Walters
(74) *Attorney, Agent, or Firm*—Kenyon & Kenyon LLP (57) ABSTRACT

In response to the driver's gearshift operation from a parking position to a drive position, the control procedure of the invention controls a motor connected to a transmission to output a center adjustment torque Tset, while the transmission is in a state of disconnecting the motor from an axle of a hybrid vehicle. The control procedure adjusts the rotation centers of respective rotational elements in the transmission by rotating the respective rotational elements, and then initiates gradual engagement of a brake to set the transmission in a low gear position. This arrangement desirably retains deviation of the rotation centers of the respective rotational elements in the transmission and prevents potential troubles due to the eccentric rotation centers of the respective rotational elements in the transmission.

11 Claims, 6 Drawing Sheets

HYBRID VEHICLE AND CONTROL METHOD OF THE SAME

This is a 371 national phase application of PCT/JP2005/018214 filed 26 Sep. 2005, which claims priority to Japanese Patent Application No. 2004-293651 filed 6 Oct. 2004, the contents of which are incorporated herein by reference.

TECHNICAL FIELD

The present invention relates to a hybrid vehicle and a control method of the hybrid vehicle.

BACKGROUND ART

One proposed hybrid vehicle outputs power of an internal combustion engine to a drive shaft via a control motor and a power distribution planetary gear mechanism, while outputting power of a drive motor to the drive shaft via an automatic transmission (see, for example, Japanese Patent Laid-Open Gazette No. 2004-66898). The automatic transmission of this hybrid vehicle includes two interlinked planetary gears and two brakes for fastening some of rotational elements of the two planetary gears to the casing. The engagement of one brake in combination with the release of the other brake enables speed change at two different gear ratios, high gear position (Hi) and low gear position (Lo). The release of both the two brakes disconnects the drive motor from the drive shaft.

DISCLOSURE OF THE INVENTION

In the prior art hybrid vehicle, the automatic transmission may have some problems, for example, abnormal noise and local abrasion of some rotational elements of the planetary gear. In the released state of both the two brakes in the automatic transmission, some of the rotational elements included in the two planetary gears are supported by gear linkage. The gear linkage generally has a little clearance provided for smooth gear operation. In the released state of both the two brakes with a stop of all the rotational elements of the two planetary gears in the automatic transmission, the own weights of the rotational elements supported by the gear linkage move the respective rotational elements down by the clearance. In response to the driver's gearshift operation to engage one brake of the automatic transmission, the rotational axes of the respective rotational elements are positioned in this state. Namely the downward movements of the rotational elements make deviation of the rotation centers of the respective rotational elements. The eccentric rotation centers of the rotational elements may cause potential troubles, for example, abnormal noise and local abrasion of gears. In a motor drive mode as one of available drive modes of the hybrid vehicle, the hybrid vehicle is driven with only the output power of the drive motor, while the internal combustion engine is at a stop. The abnormal noise of the automatic transmission makes the driver feel something is wrong.

The hybrid vehicle and the control method of the hybrid vehicle of the invention thus aim to retain deviation of the rotation centers of respective rotational elements in a transmission and to prevent potential troubles due to the eccentric rotation centers of the respective rotational elements in the transmission.

At least part of the above and the other related objects are attained by the hybrid vehicle and the control method of the hybrid vehicle having the configurations and arrangements discussed below.

The present invention is directed to a hybrid vehicle including an internal combustion engine; an electric power-mechanical power input output mechanism that is connected to an output shaft of the internal combustion engine and to a drive shaft linked with an axle of the hybrid vehicle and outputs at least part of output power of the internal combustion engine to the drive shaft through input and output of electric power and mechanical power; a motor that is capable of inputting and outputting power; an accumulator unit that transmits electric power to and from the electric power-mechanical power input output mechanism and the motor; a change gear transmission mechanism having a rotational body that is rotated with rotation of the motor and is supported with a preset clearance, while positioning a rotation center of the rotational body, converting the output power of the motor by gear change, and transmitting the converted power to the drive shaft; and a positioning control module that, in response to a positioning instruction of the rotation center of the rotational body during a stop of rotation of the rotational body of the change gear transmission mechanism without positioning the rotation center of the rotational body, controls the motor and the change gear transmission mechanism to position the rotation center of the rotational body after rotating the rotational body.

In response to a positioning instruction of the rotation center of the rotational body during a stop of rotation of the rotational body of the change gear transmission mechanism without positioning the rotation center of the rotational body, the hybrid vehicle of the invention controls the motor and the change gear transmission mechanism to position the rotation center of the rotational body after rotating the rotational body. Namely the rotation center of the rotational body is positioned after adjustment of the rotation center of the rotational body by rotation of the rotational body. This arrangement effectively retains deviation of the rotation center of the rotational body and prevents potential troubles due to the eccentric rotation center of the rotational body, for example, abnormal noise and local abrasion of gears. The 'preset clearance' includes a clearance set for a center axis of rotation in the structure of supporting the rotational body on its center axis of rotation, as well as a clearance of gear linkage in the structure of supporting the rotational body by gear linkage. The rotation center of the rotational body, includes a rotation center on which the rotational body rotates, as well as a revolution center around which the rotational body revolves.

In the hybrid vehicle of the invention, the positioning control module may control the motor and the change gear transmission mechanism to position the rotation center of the rotational body, while decreasing an output torque of the motor. This arrangement effectively prevents potential troubles caused by abrupt torque transmission to the drive shaft, for example, a torque shock and an unexpected movement of the hybrid vehicle.

In one preferable embodiment of the invention, the hybrid vehicle further includes a locking mechanism that locks the drive shaft in a non-rotatable state. The positioning control module controls the motor, the change gear transmission mechanism, and the locking mechanism to lock the drive shaft in the non-rotatable state and to position the rotation center of the rotational body after rotating the rotational body in a locked state of the drive shaft. In this embodiment, the locking mechanism may directly or indirectly lock the drive shaft through gear engagement. The locking mechanism may otherwise drive an electric actuator to directly or indirectly lock the drive shaft in the non-rotatable state by means of a frictional force. This arrangement effectively prevents an unexpected movement of the hybrid vehicle in the process of positioning the rotation center of the rotational body.

In the hybrid vehicle of the invention, the change gear transmission mechanism may include a planetary gear having the rotational body one of rotational elements. Further, the change gear transmission mechanism may include multiple planetary gears including a planetary gear having the rotational body as one of rotational elements to connect and disconnect the motor with and from the drive shaft and to convert the output power of the motor by gear change of at least two different speeds.

The present invention is directed to a control method of a hybrid vehicle including: an internal combustion engine; an electric power-mechanical power input output mechanism that is connected to an output shaft of the internal combustion engine and to a drive shaft linked with an axle of the hybrid vehicle and outputs at least part of output power of the internal combustion engine to the drive shaft through input and output of electric power and mechanical power; a motor that is capable of inputting and outputting power; an accumulator unit that transmits electric power to and from the electric power-mechanical power input output mechanism and the motor; and a change gear transmission mechanism having a rotational body that is rotated with rotation of the motor and is supported with a preset clearance, while positioning a rotation center of the rotational body, converting the output power of the motor by gear change, and transmitting the converted power to the drive shaft, and the control method including the step of: in response to a positioning instruction of the rotation center of the rotational body during a stop of rotation of the rotational body of the change gear transmission mechanism without positioning the rotation center of the rotational body, controlling the motor and the change gear transmission mechanism to position the rotation center of the rotational body after rotating the rotational body.

In response to a positioning instruction of the rotation center of the rotational body during a stop of rotation of the rotational body of the change gear transmission mechanism without positioning the rotation center of the rotational body, the control method of the hybrid vehicle of the invention controls the motor and the change gear transmission mechanism to position the rotation center of the rotational body after rotating the rotational body. Namely the rotation center of the rotational body is positioned after adjustment of the rotation center of the rotational body by rotation of the rotational body. This arrangement effectively retains deviation of the rotation center of the rotational body and prevents potential troubles due to the eccentric rotation center of the rotational body, for example, abnormal noise and local abrasion of gears. The 'preset clearance' includes a clearance set for a center axis of rotation in the structure of supporting the rotational body on its center axis of rotation, as well as a clearance of gear linkage in the structure of supporting the rotational body by gear linkage. The 'rotation center of the rotational body' includes a rotation center on which the rotational body rotates, as well as a revolution center around which the rotational body revolves.

The control method of the hybrid vehicle of the invention may control the motor and the change gear transmission mechanism to position the rotation center of the rotational body, while decreasing an output torque of the motor. This arrangement effectively prevents potential troubles caused by abrupt torque transmission to the drive shaft, for example, a torque shock and an unexpected movement of the hybrid vehicle.

In the control method of the hybrid vehicle of the invention, the hybrid vehicle may further include a locking mechanism that locks the drive shaft in a non-rotatable state, and the control method may control the motor, the change gear transmission mechanism, and the locking mechanism to lock the drive shaft in the non-rotatable state and to position the rotation center of the rotational body after rotating the rotational body in a locked state of the drive shaft. This arrangement effectively prevents an unexpected movement of the hybrid vehicle in the process of positioning the rotation center of the rotational body.

BEST MODES OF CARRYING OUT THE INVENTION

Figure 1:
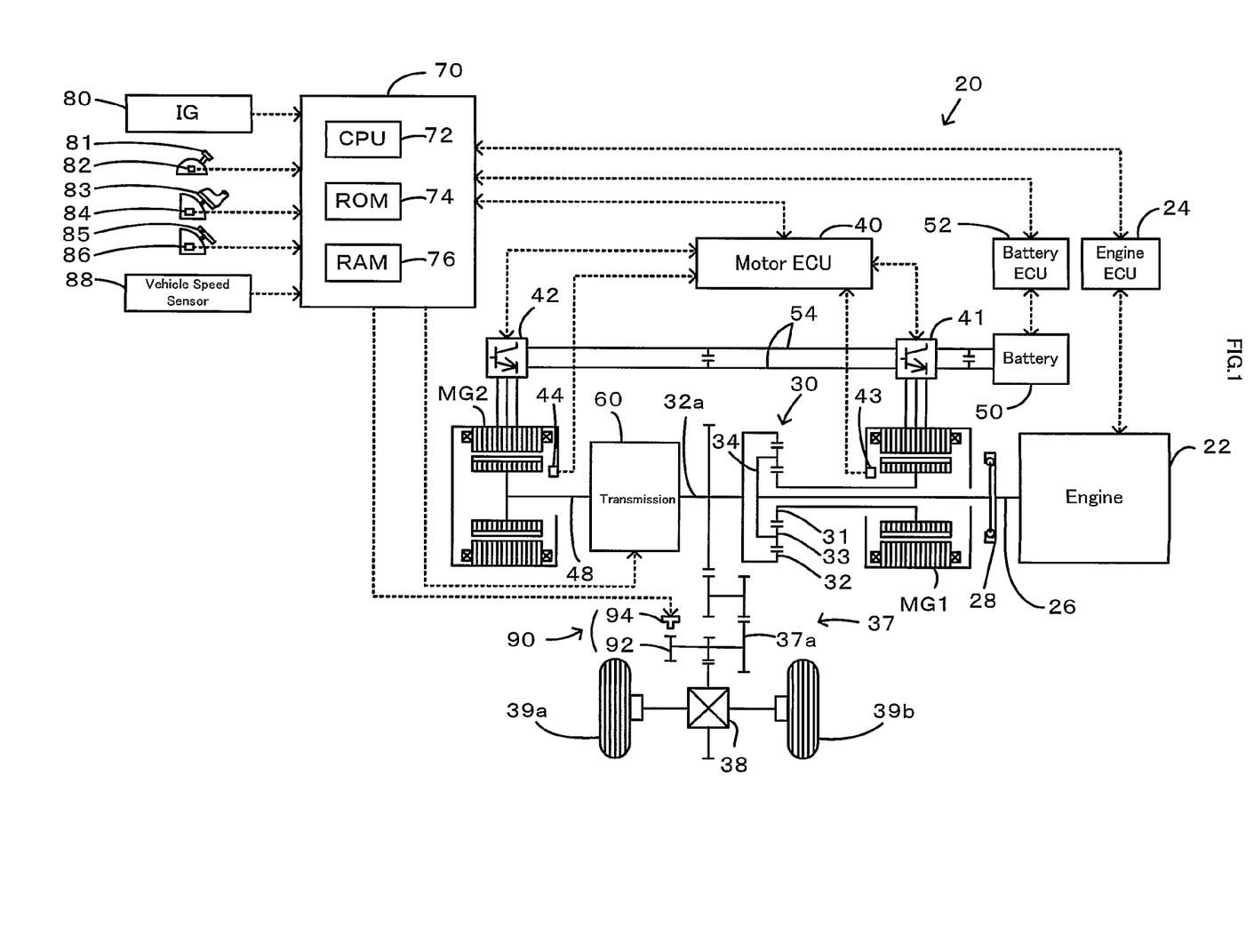
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, another motor MG2 that is linked with the power distribution integration mechanism 30 via a transmission 60, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the Motor MG2 via the transmission 60. While the motor MG1 functions as a generator, the power output from the engine 22 and input through the carrier 34 is distributed into the sun gear 31 and the ring gear 32 according to, the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The ring gear 32 is mechanically linked with drive wheels 39a and 39b, or front wheels, via a gear mechanism 37 and a differential gear 38. The power output to the ring gear 32 is thus finally transmitted to the drive wheels 39a and 39b via the differential gear 38.

A parking lock mechanism 90 is linked to the gear mechanism 37. The parking lock mechanism 90 includes a parking gear 92 that is coupled with a final gear 37a of the gear mechanism 37, and a parking lock pole 94 that engages with the parking gear 92 to lock the parking gear 92 and prohibit rotations of the parking gear 92. The parking lock pole 94 moves up and down in a vertical direction by an instruction from the CPU 72 in response to the driver's operation of a gearshift lever 81 to a parking position (P position). Engagement and release of the parking lock pole 94 with and from the parking gear 92 respectively enable and disable the parking lock function. The final gear 37a is mechanically linked to the ring gear shaft 32a or the drive shaft. Namely the parking lock mechanism 90 indirectly locks the ring gear shaft 32a or the drive shaft.

Both the motors MG1 and MG2 are known synchronous motor generators that are driven as a generator and as a motor. The motors MG1 and MG2 transmit electric power to and from a battery 50 via inverters 41 and 42 connected to a power line 54. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

Figure 2:
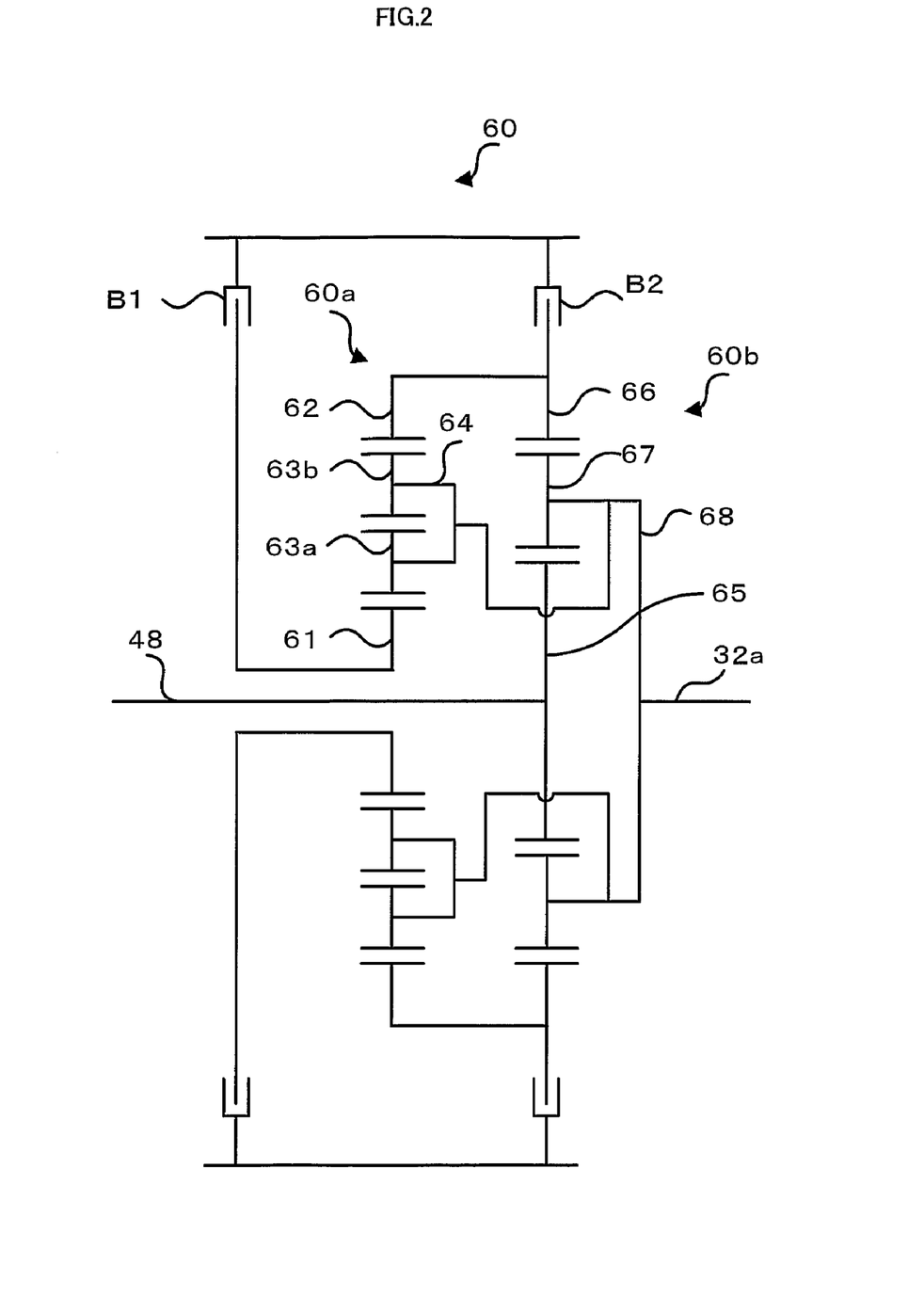
FIG. 2 schematically illustrates the structure of a transmission included in the hybrid vehicle of the embodiment.

The transmission 60 functions to connect and disconnect a rotating shaft 48 of the motor MG2 with and from the ring gear shaft 32a. In the connection state, the transmission 60 reduces the rotation speed of the rotating shaft 48 of the motor MG2 at two different reduction gear ratios and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gear 63a engaging with the sun gear 61, multiple second pinion gears 63b engaging with the multiple first pinion gears 63a and with the ring gear 62, and a carrier 64 coupling the multiple first pinion gears 63a with the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are interconnected via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively high reduction gear ratio and transmits the reduced rotation to the ring gear shaft 32a. This state is expressed as Lo gear position. The combination of the engaged brake B1 and the released brake B2 reduces the rotation of the rotating shaft 48 of the motor MG2 at a relatively low reduction gear ratio and transmits the reduced rotation to the ring gear shaft 32a. This state is expressed as Hi gear position. The combination of the engaged brakes B1 and B2 prohibits the rotations of the rotating shaft 48 and the ring gear shaft 32a. The brakes B1 and B2 are actuated by hydraulic pressures supplied from a hydraulic circuit (not shown).

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of the gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 outputs drive signals to actuators (not shown) to regulate the brakes B1 and B2 in the transmission 60. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

In the hybrid vehicle 20 of the embodiment, the gearshift lever 81 is operable to one of available gear positions, for example, a drive position (D position) for general forward drive, a reverse position (R position) for reverse drive, a parking position (P position) for parking, and a neutral position (N position).

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

The description now regards the operations of the hybrid vehicle 20 of the embodiment having the configuration discussed above, especially a series of control process in response to the driver's operation of the gearshift lever 81 from the P position to the D position. In the P position of the gearshift lever 81, the inverters 41 and 42 for driving the motors MG1 and MG2 are generally shut down, while the engine 22 is at a stop. Both the brakes B1 and B2 of the transmission 60 are released to disconnect the motor MG2 from the ring gear shaft 32a, and the parking lock function is enabled in the parking lock mechanism 90. In response to the driver's operation of the gearshift lever 81 from the P position under such conditions to the D position, the operation control of the hybrid vehicle 20 engages the brake B2 of the transmission 60 to set the transmission 60 in the Lo gear position, disables the parking lock function in the parking lock mechanism 90, and controls the motor MG2 to output a creep torque. The series of control operations described below is executed to engage the brake B2 of the transmission 60 and sets the transmission 60 in the Lo gear position.

Figure 3:
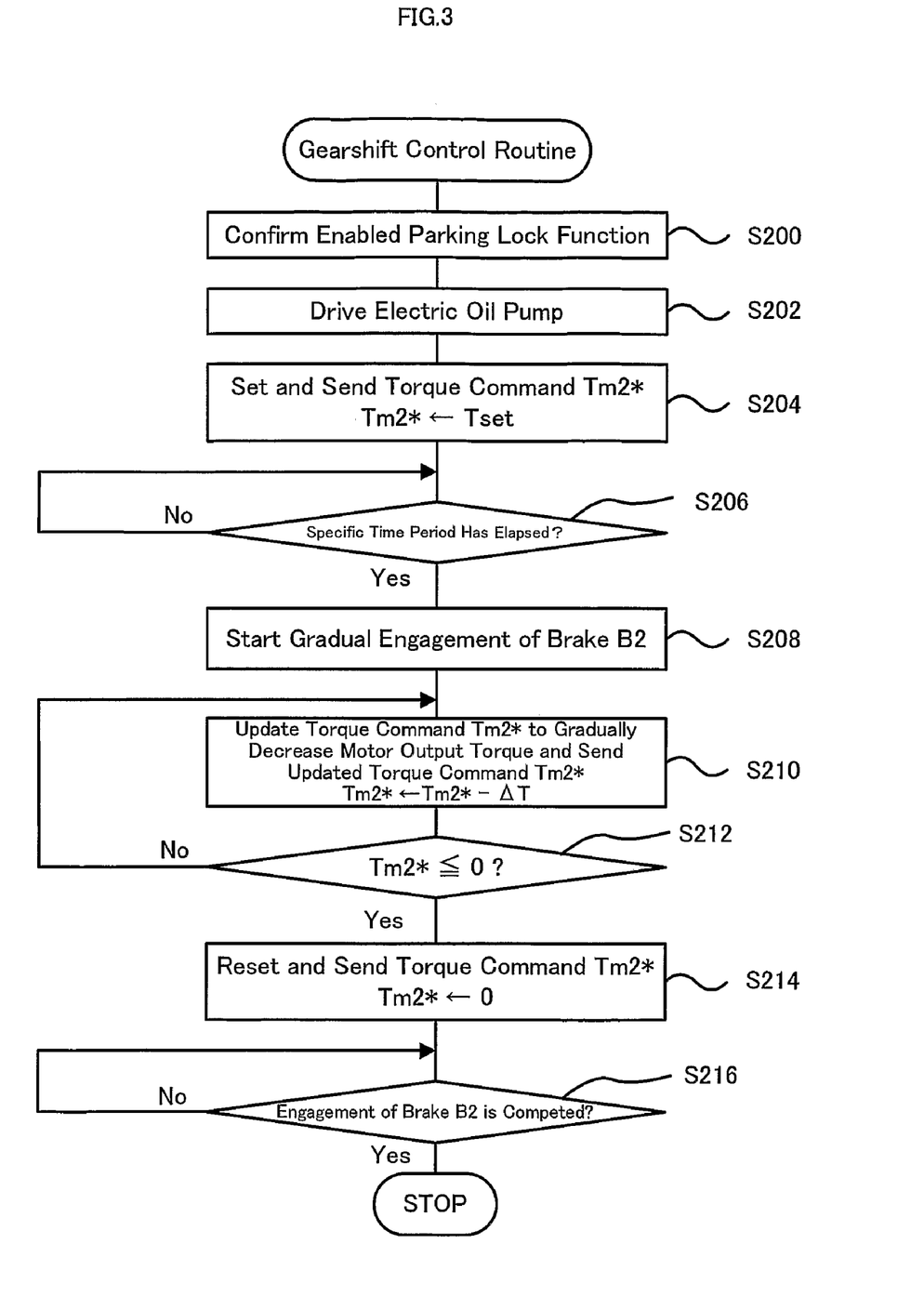
FIG. 3 is a flowchart showing a gearshift control routine executed by a hybrid electronic control unit in the hybrid vehicle of the embodiment.

FIG. 3 is a flowchart showing a gearshift control routine executed by the hybrid electronic control unit 70, in response to the driver's operation of the gearshift lever 81 from the P position to the D position to engage the brake B2 of the transmission 60 and set the transmission 60 in the Lo gear position. In the gearshift control routine, the CPU 72 of the hybrid electronic control unit 70 first confirms the enabled parking lock function in the parking lock mechanism 90 (step S200) and drives an electric oil pump (not shown) to generate a hydraulic pressure in a hydraulic circuit (not shown) to actuate the brake B2 of the transmission 60 (step S202). The CPU 72 then sets a center adjustment torque Tset to a torque command Tm2* of the motor MG2 and sends the set torque command Tm2* to the motor ECU 40 (step S204). The center adjustment torque Tset is used to adjust the rotation centers of the respective rotational elements (center adjustment) included in the double-pinion planetary gear mechanism 60a and in the single-pinion planetary gear mechanism 60b of the transmission 60. The center adjustment torque Tset is set as a torque level required for center adjustment by rotations of the respective rotational elements in the transmission 60. The motor ECU 40 receives the torque command Tm2* and controls switching elements of the inverter 42 to ensure output of a torque corresponding to the received torque command Tm2* from the motor MG2. The respective rotational elements in the transmission 60 are coupled by gear linkage. In the released state of both the two brakes B1 and B2 of the transmission 60 with a stop of rotations of the respective rotational elements, the own weights of the rotational elements deviate the rotation centers of the respective rotational elements downward by a preset little clearance provided for the smooth gear operation. The control procedure of the embodiment rotates the rotational elements of the transmission 60 with the output torque from the motor MG2 to restore the preset little clearance required for the smooth gear operation of the respective rotational elements, thereby adjusting the rotation centers of the respective rotational elements to their original expected positions. The terminology 'rotation center' here represents the center axis on which each rotational element rotates, as well as the center axis around which any of the pinion gears 63a, 63b, and 67 revolves.

The CPU 72 waits for elapse of a specific time period since the start of the output of the center adjustment torque Tset from the motor MG2 (step S206) and initiates gradual engagement of the brake B2 (step S208). The specific time period represents a required time for center adjustment by rotations of the respective rotational elements of the transmission 60, and is set, for example, in a range of 0.5 to several seconds. The gradual engagement of the brake B2 is actualized by gradual supply of the hydraulic pressure from the hydraulic circuit to a cylinder of the brake B2. The CPU 72 repeatedly updates the torque command Tm2* to gradually decrease the output torque of the motor MG2 with the gradual engagement of the brake B2 and sends the updated torque command Tm2* to the motor ECU 40, which controls the motor MG2 to output the gradually decreasing torque corresponding to the updated torque command Tm2* (steps S210 to S214). The gradual decrease of the output torque of the motor MG2 is regulated to be completed simultaneously with or slightly earlier than the complete engagement of the brake B2. The gradual engagement of the brake B2 and the corresponding gradual decrease of the output torque from the motor MG2 effectively prevent a potential torque shock arising on the ring gear shaft 32a due to the abrupt engagement of the brake B2.

The gearshift control routine is terminated on detection of complete engagement of the brake B2 (step S216). The hybrid electronic control unit 70 then disables the parking lock function in the parking lock mechanism 90, controls the motor MG2 to output a creep torque, and executes the drive control according to the driver's depression amount of the accelerator pedal 83. The engagement of the brake P2 fixes the ring gear 66 of the single-pinion planetary gear mechanism 60b to the casing and thereby positions the rotation center of the ring gear 66. The other rotational elements of the single-pinion planetary gear mechanism 60b and the rotational elements of the double-pinion planetary gear mechanism 60a are directly or indirectly linked to the ring gear 66. The positioning of the ring gear 66 thus automatically determines the positions of the rotation centers of the other rotational elements.

Figure 4:
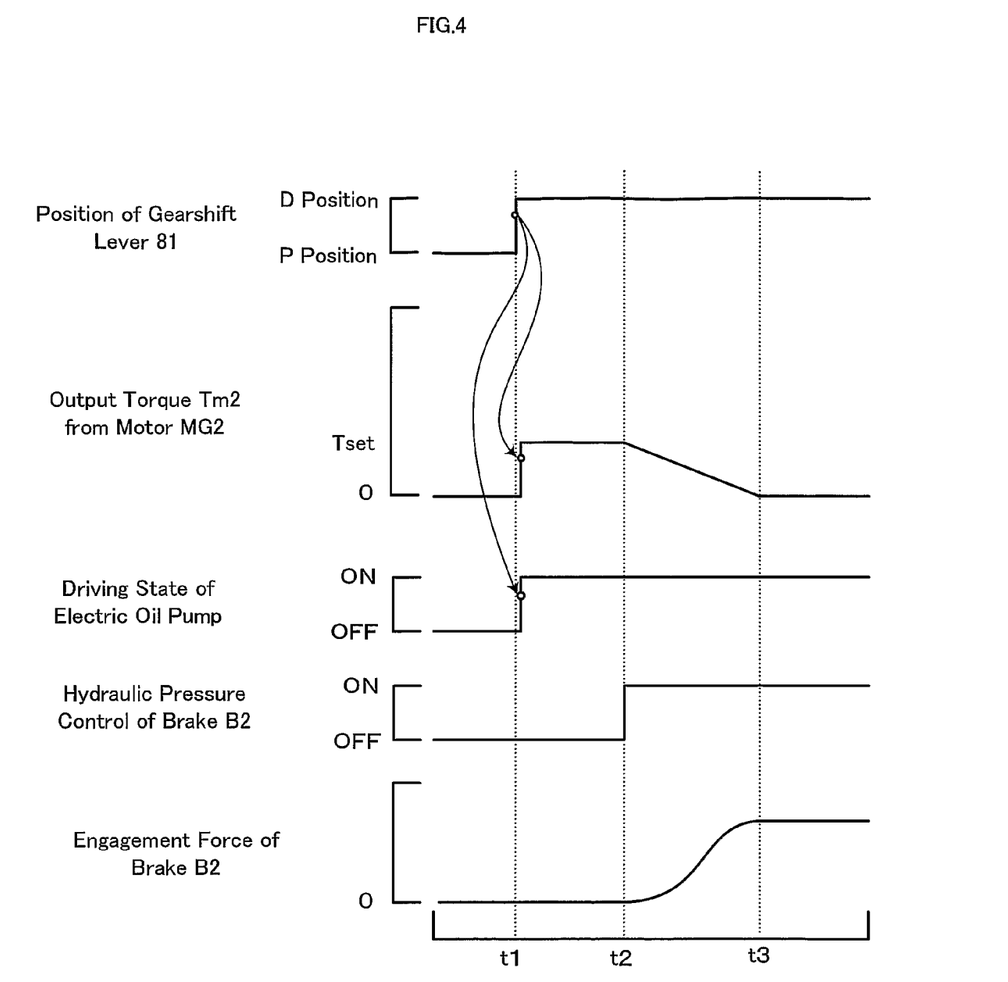
FIG. 4 is a graph showing time variations in output torque Tm2 of a motor MG2, in driving state of an electric oil pump for generation of a hydraulic pressure, and in engagement force of a brake B2 in response to the driver's operation of a gearshift lever.

FIG. 4 is a graph showing time variations in output torque Tm2 of the motor MG2, in driving state of the electric oil pump to generate a hydraulic pressure, and in engagement force of the brake B2 in the control process to engage the brake B2 of the transmission 60 and set the transmission 60 in the Lo gear position in response to the driver's operation of the gearshift lever 81 from the P position to the D position. In response to the driver's operation of the gearshift lever 81 from the P position to the D position at a time t1, the control procedure drives the electric oil pump to generate a hydraulic pressure required for actuating the brake B2 and controls the motor MG2 to output the center adjustment torque Tset. This rotates the rotational elements of the transmission 60 and adjusts the rotation centers of the respective rotational elements. At a time point t2 when the specific time period has elapsed since the start of the output of the center adjustment torque Tset from the motor MG2, the control procedure initiates gradual engagement of the brake B2 and gradual decrease of the output torque from the motor MG2. The gradual engagement of the brake B2 and the corresponding gradual decrease of the output torque from the motor MG2 effectively prevent a potential torque shock arising on the ring gear shaft 32a due to the abrupt engagement of the brake B2. At a time point t3, the brake B2 is completely engaged.

In response to the driver's operation of the gearshift lever 81 from the P position to the D position, the hybrid vehicle 20 of the embodiment controls the motor MG2 to rotate the rotational elements of the transmission 60 and adjusts the rotation centers of the respective rotation elements, prior to engagement of the brake B2 and setting of the transmission 60 in the Lo gear position. Such control desirably restrains deviation of the rotation centers of the respective rotational elements of the transmission 60 and prevents potential troubles due to the eccentric rotation centers of the rotational elements of the transmission 60, for example, abnormal noise and local abrasion of gears. The control procedure gradually increases the engagement force of the brake B2 to the complete engagement of the brake B2, while controlling the motor MG2 to gradually decrease the output torque. This arrangement effectively prevents a potential torque shock arising on the ring gear shaft 32a due to the abrupt engagement of the brake B2. The center adjustment of the rotational elements of the transmission 60 is performed after confirmation of the enabled parking lock function in the parking lock mechanism 90. This prevents any unexpected movement of the hybrid vehicle 20.

The hybrid vehicle 20 of the embodiment gradually decreases the torque command Tm2* with gradual engagement of the brake B2. The gradually decreasing torque command Tm2* reaches zero simultaneously with or slightly earlier than complete engagement of the brake B2. A modified control procedure may set the torque command Tm2* equal to 0 simultaneously with the start of the gradual engagement of the brake B2.

The hybrid vehicle 20 of the embodiment drives the electric oil pump to generate a hydraulic pressure in the hydraulic circuit for actuation of the brake B2, before controlling the motor MG2 to output the torque. In the structure that enables the brake B2 to apply the engagement force simultaneously with actuation of the electric oil pump, the engagement force of the brake B2 may be applied simultaneously with actuation of the electric oil pump, after the center adjustment.

In the hybrid vehicle 20 of the embodiment, the brake B2 is engaged with the hydraulic pressure supplied from the hydraulic circuit. The brake B2 may otherwise be engaged by an electric actuator.

The hybrid vehicle 20 of the embodiment locks the ring gear shaft 32a or the drive shaft by enabling the parking lock function in the parking lock mechanism 90. One modified control may use an electric actuator to directly or indirectly actuate a mechanical brake and lock the ring gear shaft 32a or the drive shaft by friction.

The above description regards the series of control process in response to the driver's gearshift operation from the P position to the D position in the hybrid vehicle 20 of the embodiment. The control technique is also applicable to a gearshift operation from the N position to the D position, a gearshift operation from the P position to the R position, and a gearshift operation from the N position to the R position. In the gearshift operations from the N position, the control procedure should perform the center adjustment after enabling the parking lock function in the parking lock mechanism 90.

In the hybrid vehicle 20 of the embodiment, the transmission 60 is structured to have the two different speeds, that is, the Lo gear position and the Hi gear position. The transmission may have any arrangement that enables the motor MG2 to be connected with and disconnected from the ring gear shaft 32a or the drive shaft and has rotational elements, which are rotated with rotation of the motor MG2 and are supported with a preset clearance. For example, the transmission may have three or more different speeds or may be structured as a disconnectable reduction gear having one planetary gear.

Figure 5:
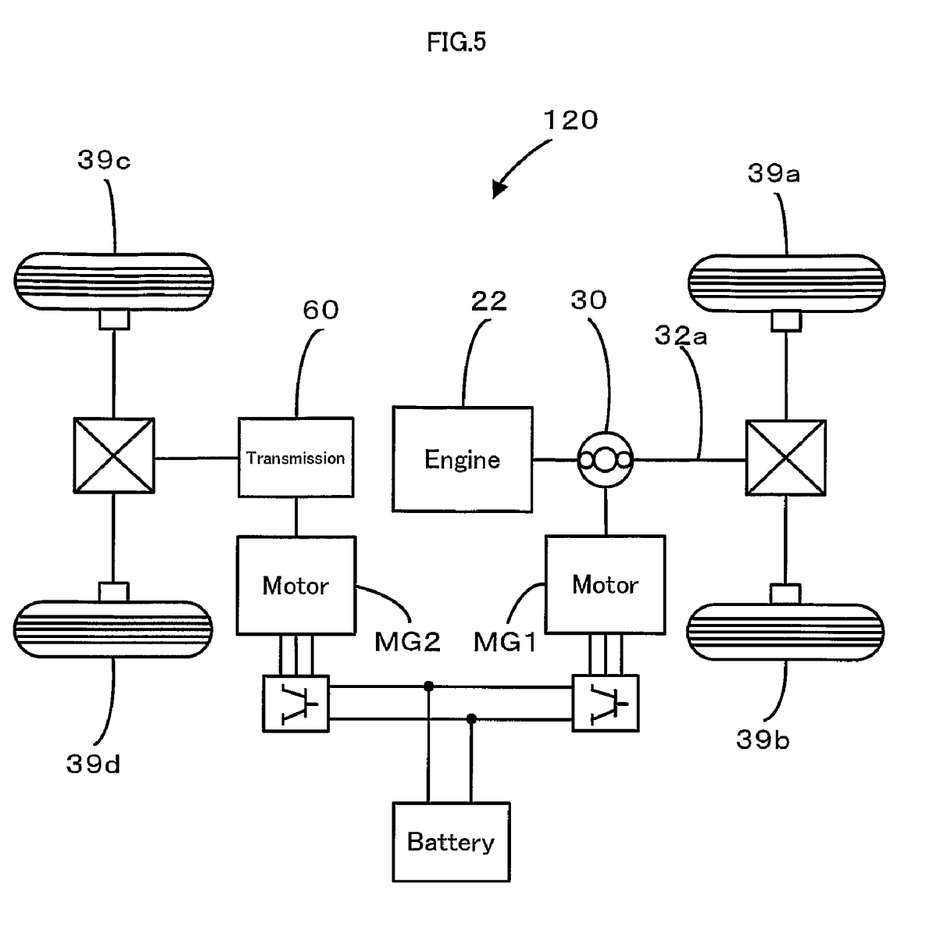
FIG. 5 schematically illustrates the configuration of another hybrid vehicle in one modified example.

In the hybrid vehicle 20 of the embodiment described above, the power of the motor MG2 is converted by the gear change in the transmission 60 and is output to the ring gear shaft 32a. The technique of the invention is, however, not restricted to this configuration but is also applicable to a hybrid vehicle 120 of a modified configuration shown in FIG. 5. In the hybrid vehicle 120 of this modified example, the power of the motor MG2 is connected via the gear change in the transmission 60 to a different axle (axle linked to wheels 39c and 39d) from an axle connected with the ring gear shaft 32a (axle linked to the drive wheels 39a and 39b).

Figure 6:
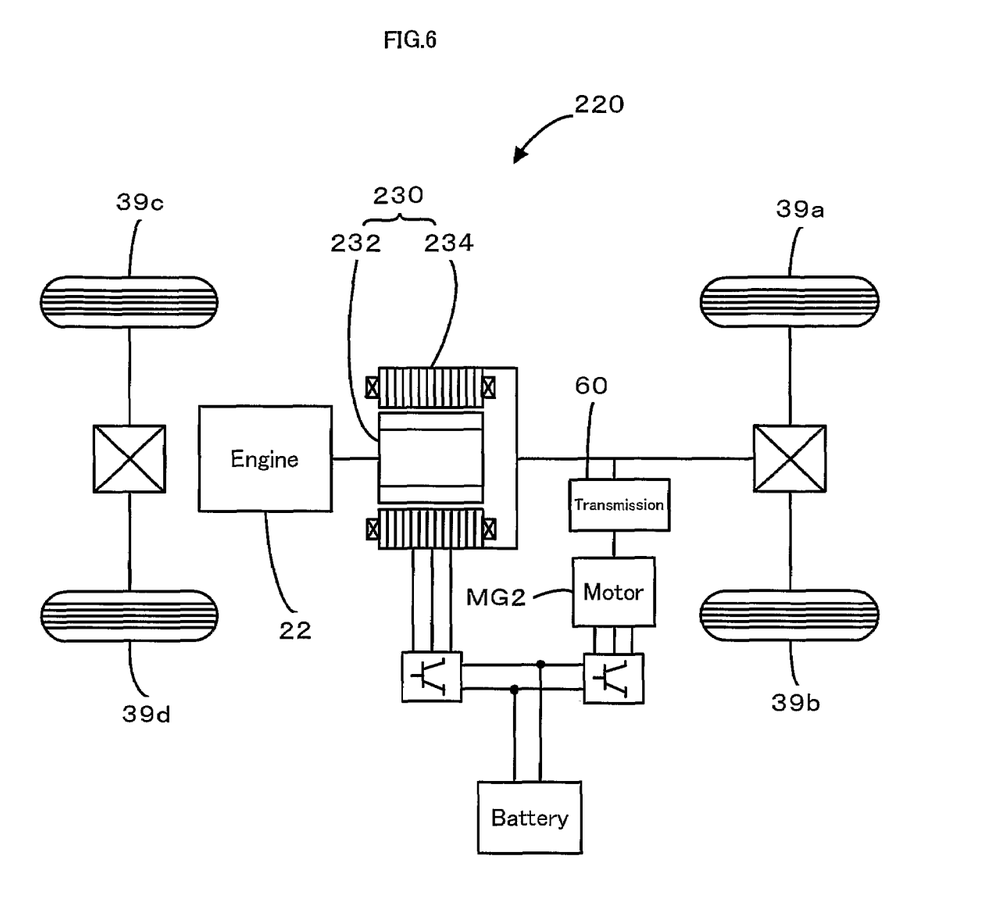
FIG. 6 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 39a and 39b. In another possible modification of FIG. 6, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 39a, 39b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is desirably applicable to the manufacturing industry of hybrid vehicles.

The invention claimed is:

1. A hybrid vehicle, comprising:
an internal combustion engine;
an electric power-mechanical power input output mechanism that is connected to an output shaft of the internal combustion engine and to a drive shaft linked with an axle of said hybrid vehicle and outputs at least part of output power of the internal combustion engine to the drive shaft through input and output of electric power and mechanical power;
a motor that is capable of inputting and outputting power;
an accumulator unit that transmits electric power to and from the electric power-mechanical power input output mechanism and the motor;
a change gear transmission mechanism having a rotational body that is rotated with rotation of the motor and is supported with a preset clearance, said change gear transmission mechanism positioning a rotation center of the rotational body, converting the output power of the motor by gear change, and transmitting the converted power to the drive shaft; and
a positioning control module that, in response to a positioning instruction of the rotation center of the rotational body during a stop of rotation of the rotational body of the change gear transmission mechanism without positioning the rotation center of the rotational body, controls the motor and the change gear transmission mechanism to position the rotation center of the rotational body after rotating the rotational body.

2. A hybrid vehicle in accordance with claim 1, wherein said positioning control module controls the motor and the change gear transmission mechanism to position the rotation center of the rotational body, while decreasing an output torque of the motor.

3. A hybrid vehicle in accordance with claim 1, said hybrid vehicle further comprising:
a locking mechanism that locks the drive shaft in a non-rotatable state,
wherein said positioning control module controls the motor, the change gear transmission mechanism, and the locking mechanism to lock the drive shaft in the non-rotatable state and to position the rotation center of the rotational body after rotating the rotational body in a locked state of the drive shaft.

4. A hybrid vehicle in accordance with claim 3, wherein the locking mechanism either directly or indirectly locks the drive shaft through gear engagement.

5. A hybrid vehicle in accordance with claim 3, wherein the locking mechanism drives an electric actuator to either directly or indirectly lock the drive shaft in the non-rotatable state by means of a frictional force.

6. A hybrid vehicle in accordance with claim 1, wherein the change gear transmission mechanism comprises a planetary gear having the rotational body one of rotational elements.

7. A hybrid vehicle in accordance with claim 1, wherein the change gear transmission mechanism comprises multiple planetary gears including a planetary gear having the rotational body as one of rotational elements to connect and disconnect the motor with and from the drive shaft and to convert the output power of the motor by gear change of at least two different speeds.

8. A control method of a hybrid vehicle, said hybrid vehicle comprising: an internal combustion engine; an electric power-mechanical power input output mechanism that is connected to an output shaft of the internal combustion engine and to a drive shaft linked with an axle of said hybrid vehicle and outputs at least part of output power of the internal combustion engine to the drive shaft through input and output of electric power and mechanical power; a motor that is capable of inputting and outputting power; an accumulator unit that transmits electric power to and from the electric power-mechanical power input output mechanism and the motor; and a change gear transmission mechanism having a rotational body that is rotated with rotation of the motor and is supported with a preset clearance, said change gear transmission mechanism positioning a rotation center of the rotational body, converting the output power of the motor by gear change, and transmitting the converted power to the drive shaft,
said control method comprising the step of:
in response to a positioning instruction of the rotation center of the rotational body during a stop of rotation of the rotational body of the change gear transmission mechanism without positioning the rotation center of the rotational body, controlling the motor and the change gear transmission mechanism to position the rotation center of the rotational body after rotating the rotational body.

9. A control method of a hybrid vehicle in accordance with claim 8, wherein said step controls the motor and the change gear transmission mechanism to position the rotation center of the rotational body, while decreasing an output torque of the motor.

10. A control method of a hybrid vehicle in accordance with claim 8, said hybrid vehicle further comprising a locking mechanism that locks the drive shaft in a non-rotatable state,
wherein said step controls the motor, the change gear transmission mechanism, and the locking mechanism to lock the drive shaft in the non-rotatable state and to position the rotation center of the rotational body after rotating the rotational body in a locked state of the drive shaft.

11. A drive system of driving a drive shaft, comprising:
a motor that is capable of inputting and outputting power;
an accumulator unit that transmits electric power to and from the motor;
a change gear transmission mechanism having a rotational body that is rotated with rotation of the motor and is supported with a preset clearance, said change gear transmission mechanism positioning a rotation center of the rotational body, converting the output power of the motor by gear change, and transmitting the converted power to the drive shaft; and
a positioning control module that, in response to a positioning instruction of the rotation center of the rotational body during a stop of rotation of the rotational body of the change gear transmission mechanism without positioning the rotation center of the rotational body, controls the motor and the change gear transmission mechanism to position the rotation center of the rotational body after rotating the rotational body.

* * * * *

UNITED STATES PATENT AND TRADEMARK OFFICE
CERTIFICATE OF CORRECTION

PATENT NO.        : 7,597,165 B2                                                      Page 1 of 1
APPLICATION NO.   : 11/661986
DATED             : October 6, 2009
INVENTOR(S)       : Jiro Kaneko et al.

It is certified that error appears in the above-identified patent and that said Letters Patent is hereby corrected as shown below:

On the Title Page: Change

"(75) Inventors: Jiro Kaneko, Toyota (JP), Masatoshi Adachi, Aichi-ken (JP)"

to

--(75) Inventors: Jiro Kaneko, Toyota (JP), Masatoshi Adachi, Nishikamo-gun (JP)--.

| Column | Line | |
|---|---|---|
| 1  | 42 | Delete "own". |
| 5  | 6  | Change "Motor" to --motor--. |
| 5  | 9  | Change "to, the" to --to the--. |
| 8  | 27 | Delete "own". |
| 8  | 28 | After "deviate" insert --from--. |
| 9  | 3  | Change "brake P2" to --brake B2--. |
| 11 | 38 | Change "A hybrid" to --The hybrid--. |
| 11 | 43 | Change "A hybrid" to --The hybrid--. |
| 11 | 53 | Change "A hybrid" to --The hybrid--. |
| 11 | 56 | Change "A hybrid" to --The hybrid--. |
| 11 | 60 | Change "A hybrid" to --The hybrid--. |
| 11 | 63 | Change "A hybrid" to --The hybrid--. |
| 12 | 32 | Change "A control" to --The control--. |
| 12 | 37 | Change "A control" to --The control--. |

Signed and Sealed this

Eighteenth Day of May, 2010

David J. Kappos
*Director of the United States Patent and Trademark Office*